(12) United States Patent
Dale et al.

(10) Patent No.: US 8,001,783 B2
(45) Date of Patent: Aug. 23, 2011

(54) APPARATUS, SYSTEM, AND METHOD FOR TURBOCHARGER BYPASS AND EXHAUST BRAKING WITH A SINGLE VALVE

(75) Inventors: Adrian P. Dale, Columbus, IN (US); Vivek A. Sujan, Columbus, IN (US)

(73) Assignee: Cummins IP, Inc., Minneapolis, MN (US)

( * ) Notice: Subject to any disclaimer, the term of this patent is extended or adjusted under 35 U.S.C. 154(b) by 743 days.

(21) Appl. No.: 12/019,503

(22) Filed: Jan. 24, 2008

(65) Prior Publication Data
US 2009/0188251 A1 Jul. 30, 2009

(51) Int. Cl.
*F02B 33/44* (2006.01)
*F02B 33/00* (2006.01)
*F02B 37/02* (2006.01)
*F02B 37/12* (2006.01)
*F02B 37/22* (2006.01)
*F02B 37/00* (2006.01)

(52) U.S. Cl. .................. 60/612; 123/562; 137/625.19; 137/625.46; 137/625.47; 137/625.48

(58) Field of Classification Search ............ 60/612; 123/562; 137/625.46, 625.47, 625.48, 625.5; F02B 37/12, 37/22, 37/02, 37/00
See application file for complete search history.

(56) References Cited

U.S. PATENT DOCUMENTS

| 4,355,659 | A | * | 10/1982 | Kelchner | 137/625.19 |
| 4,388,802 | A | * | 6/1983 | Dinger et al. | 60/612 |
| 4,800,726 | A | | 1/1989 | Okada et al. | 60/614 |
| 6,378,509 | B1 | | 4/2002 | Feucht et al. | 123/568.12 |
| 6,801,846 | B1 | | 10/2004 | Rodriguez et al. | 701/102 |
| 6,973,787 | B2 | * | 12/2005 | Klingel | 60/612 |
| 7,540,150 | B2 | * | 6/2009 | Schmid et al. | 60/612 |
| 7,637,106 | B2 | * | 12/2009 | Hertweck et al. | 60/602 |
| 2004/0134193 | A1 | | 7/2004 | Klingel | 60/612 |
| 2007/0056283 | A1 | | 3/2007 | Klingel | 60/612 |
| 2008/0000628 | A1 | | 1/2008 | Spryshak | |
| 2008/0196409 | A1 | * | 8/2008 | Goebelbecker et al. | 60/612 |
| 2009/0211245 | A1 | * | 8/2009 | Mcewan et al. | 60/602 |
| 2009/0241540 | A1 | * | 10/2009 | Robel | 60/612 |

FOREIGN PATENT DOCUMENTS

| DE | 3629841 | A1 | * | 5/1987 |
| DE | 3735736 | A1 | * | 5/1989 |
| DE | 10132672 | A1 | * | 1/2003 |
| JP | 07293262 | A | * | 11/1995 |
| WO | WO 2004/067932 | | | 8/2004 |
| WO | WO2008/015399 | A1 | * | 2/2008 |

OTHER PUBLICATIONS

PCT/US2009/032035 International Search Report and Written Opinion, Mar. 10, 2009.

* cited by examiner

*Primary Examiner* — Thai Ba Trieu
(74) *Attorney, Agent, or Firm* — Kunzler Needham Massey & Thorpe; J. Bruce Schelkopf

(57) ABSTRACT

An apparatus, system, and method are disclosed for a single-actuated multi-function valve. The apparatus includes a primary fluid conduit, a secondary fluid conduit, and a valve. The primary fluid conduit flows from an exhaust manifold to an outlet through a high pressure turbocharger and a low pressure turbocharger. The secondary fluid conduit flows from the exhaust manifold to an outlet through the low pressure turbocharger. The valve has two flow passages—the first flow passage is a variable restriction within the primary fluid conduit, and the second flow passage is a variable restriction within the secondary fluid conduit. Turning the valve one direction from a nominal position controls the flow ratios in the primary and secondary fluid conduits, while turning the valve in the other direction from the nominal position controls exhaust braking.

22 Claims, 9 Drawing Sheets

APPARATUS, SYSTEM, AND METHOD FOR TURBOCHARGER BYPASS AND EXHAUST BRAKING WITH A SINGLE VALVE

BACKGROUND OF THE INVENTION

1. Field of the Invention

This invention relates to an apparatus for fluid dynamic control and more particularly relates to an apparatus for channeling an exhaust flow.

2. Description of the Related Art

Modern combustion engines meeting rigorous emissions standards often employ various turbocharger schemes to achieve fuel economy, emissions, and power density requirements. A multiple turbocharger system often includes the use of a bypass valve as the first stage turbocharger may be small and not designed for the full air flow of the engine at rated operation. It is often desirable that an engine perform braking functions as well as power functions. In some engines, the engine valve timing is changed such that the engine collects work from the wheels by compressing air within the engine cylinders and venting the still-compressed air. However, engine braking systems are often expensive and in some vehicles the benefits may not support the cost. In some applications, a valve in an exhaust line may perform the functions of the engine braking, which is often called "exhaust braking." When the valve begins to close, the back pressure begins to increase on the engine, and the pressure losses across the valve consume work and provide a braking function.

The introduction of multiple turbocharger systems complicates the systems of exhaust braking. An exhaust braking valve which is not downstream of the bypass valve is not sufficient to perform the exhaust braking function alone, as the exhaust can flow through a bypass line with relatively low pressure loss. Placing the exhaust brake past all turbochargers will typically allow exhaust braking to perform properly, but this implementation limits the generality of installations, and may require excess wire lengths for exhaust valve actuators and sensors depending upon the availability of a place in the exhaust line that is downstream of the bypass line and turbochargers. Additionally, in some applications it may be useful to block flow through a small turbocharger completely, and this is not available in a bypass system with the exhaust valve completely downstream of the bypass line.

Therefore, current systems require a bypass valve and a separate exhaust braking valve, and further require that the exhaust brake valve be installed in a limited number of positions—specifically downstream of the bypass line.

SUMMARY OF THE INVENTION

From the foregoing discussion, Applicant asserts that that a need exists for an apparatus, system, and method to flexibly install an exhaust braking valve in a combustion engine having a bypass line. Beneficially, such an apparatus, system, and method would permit a single valve mechanism to perform the exhaust braking and bypassing functions and thereby reduce system cost.

The present invention has been developed in response to the present state of the art, and in particular, in response to the problems and needs in the art that have not yet been fully solved by currently available methods. Accordingly, the present invention has been developed to provide an apparatus, system, and method for turbocharger bypass and exhaust braking with a single valve that overcome many or all of the above-discussed shortcomings in the art.

An apparatus is disclosed for a single-actuated multi-function valve which may be a barrel valve. The apparatus includes a primary fluid conduit fluidly coupling an exhaust manifold to an exhaust outlet through a high pressure turbocharger and a low pressure turbocharger. The apparatus also includes a secondary fluid conduit fluidly coupling the exhaust manifold to the exhaust outlet through the low pressure turbocharger. Furthermore, the apparatus comprises a valve having a first flow passage comprising a variable restriction disposed within the primary fluid conduit, and a second flow passage comprising a variable restriction disposed within the secondary fluid conduit.

In one embodiment, turning the valve in a first direction from a nominal position allows the valve to be operable in a standard mode controlling an amount of primary flow in the primary fluid conduit and an amount of bypass flow in the secondary fluid conduit. In a further embodiment, turning the valve in a second direction from the nominal position allows the valve to be operable in a brake mode. The first flow passage may be disposed within the primary fluid conduit at a position upstream or downstream of the high pressure turbocharger.

A method is disclosed for a single-actuated multi-function valve. The method includes providing the primary fluid conduit, the secondary fluid conduit, and the valve having the first flow passage and the second flow passage. The method further includes operating the valve in the standard mode and the brake mode. In one embodiment, operating the valve in the standard mode includes turning the valve between a nominal position comprising a high primary flow, and a full bypass position comprising a high bypass flow. In an alternate embodiment, operating the valve in the standard mode includes turning the valve between a nominal position comprising a high bypass flow, and a full primary position comprising a high primary flow. The method may further include turning the valve in a first direction to turn the valve from the nominal position to the full primary position, and turning the valve in a second direction to operate the valve in the brake mode.

A system is disclosed for a single-actuated multi-function valve. The system includes a combustion engine producing an exhaust flow directed into an exhaust manifold coupled to the engine. The system further includes a primary fluid conduit fluidly coupling an exhaust manifold to an exhaust outlet through a high pressure turbocharger and a low pressure turbocharger. The system also includes a secondary fluid conduit fluidly coupling the exhaust manifold to the exhaust outlet through the low pressure turbocharger. The system further includes a valve having a first flow passage comprising a variable restriction disposed within the primary fluid conduit, and a second flow passage comprising a variable restriction disposed within the secondary fluid conduit. The system may further include a controller in communication with an actuator coupled to the valve. The controller includes a valve position target module that generates a valve position target, and a valve position command module that generates a valve position command in response to the valve position target. The actuator receives the valve position command and turns the valve in response to the valve position command. In one embodiment, the actuator turns the valve in response to the valve position command in one of a first direction corresponding to a standard mode and a second direction corresponding to a brake mode.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
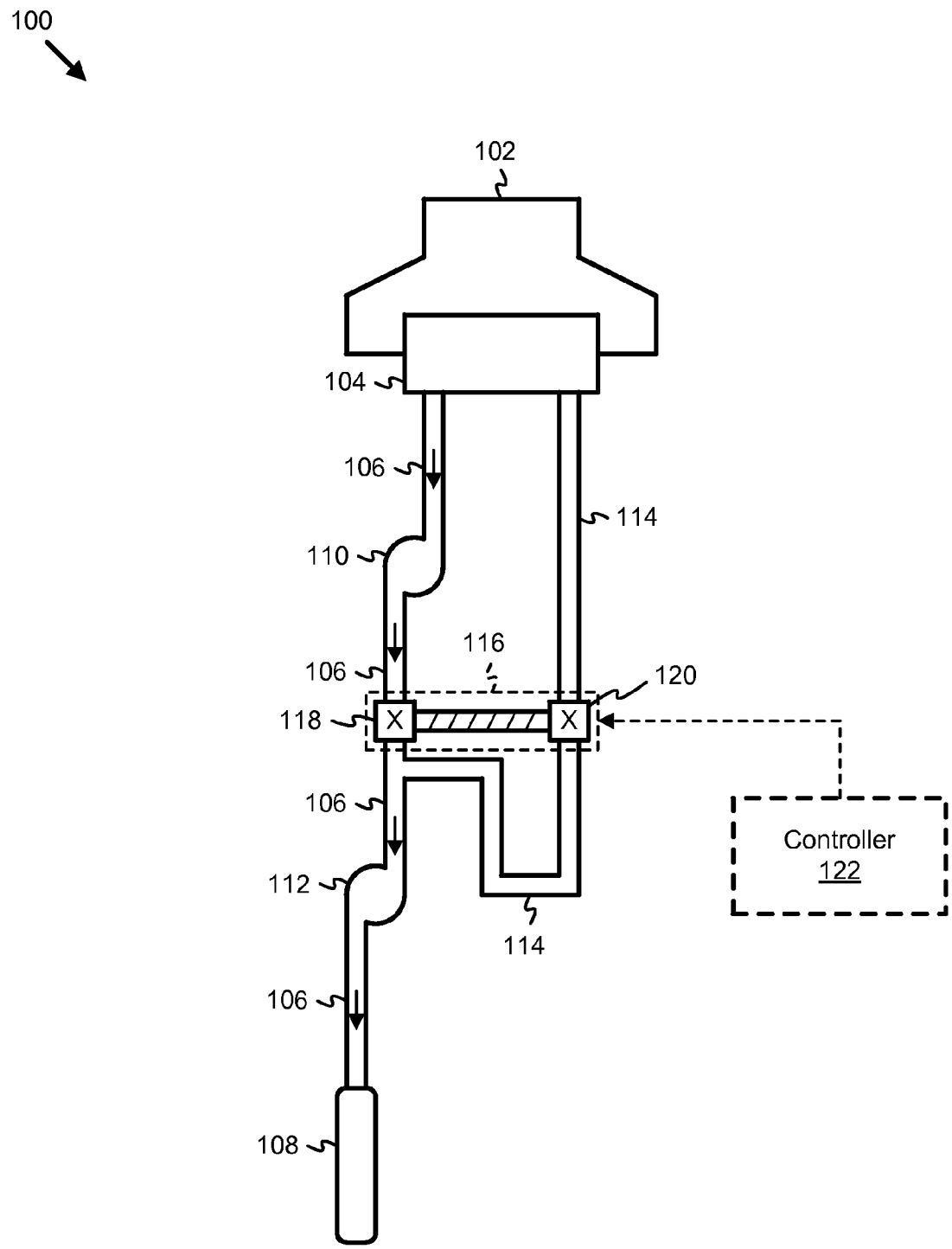
FIG. 1 is a schematic block diagram depicting one embodiment of a system for a single-actuated multi-function valve in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a signal bearing medium may take any form capable of generating a signal, causing a signal to be generated, or causing execution of a program of machine-readable instructions on a digital processing apparatus. A signal bearing medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a schematic block diagram depicting one embodiment of a system 100 for a single-actuated multi-function valve in accordance with the present invention. The system 100 comprises a combustion engine 102 producing an exhaust flow. The exhaust flow is directed into an exhaust manifold 104 coupled to the combustion engine 102. The system 100 further comprises a primary fluid conduit 106 coupling the exhaust manifold 104 to an exhaust outlet 108 through a high pressure turbocharger 110 and a low pressure turbocharger 112. The high pressure turbocharger 110 and the low pressure turbocharger 112 may be fixed geometry turbochargers, wastegated turbocharger, and/or variable geometry turbochargers.

The system 100 includes a secondary fluid conduit 114 that fluidly couples the exhaust manifold 104 to the exhaust outlet 108 through the low pressure turbocharger 112. The secondary fluid conduit 114 may serve as an exhaust flow bypass 114 directing fluid flows around the high pressure turbocharger 110. During periods of engine operation resulting in high pressures, mass flows, and/or velocities in the primary fluid conduit 106 the secondary fluid conduit 114 may divert fluid flows from the primary fluid conduit 106 protecting the high pressure turbocharger 110 from potential overspeed, and reducing the overall restriction in the exhaust flow.

The system 100 comprises a valve 116 having a first flow passage 118 comprising a variable restriction 118 disposed within the primary fluid conduit 106. The valve 116 further has a second flow passage 120 comprising a variable restriction 120 disposed within the secondary fluid conduit 114. In one embodiment of the system 100 the valve 116 may comprise a barrel valve 116. The system 100 may direct exhaust flow around the high pressure turbocharger 110 by restricting fluid flows through the first flow passage 118 and opening the variable restriction 120 allowing exhaust flow from the exhaust manifold 104 to move through the bypass conduit 114 around the high pressure turbocharger 110. In the depicted embodiment of the present invention the first flow passage 118 may be disposed within the primary fluid conduit 106 at a position downstream of the high pressure turbocharger 110 and upstream of the low pressure turbocharger 112.

The primary fluid conduit 106 and the secondary fluid conduit 114 are shown in FIG. 1 as lying in the plane of the illustration with the valve 116. To avoid obscuring essential aspect of the present invention, further references to conduits coupled to the valve 116 are shown to lie within the plane of the valve 116 although other orientations are contemplated within the scope of the present invention. For example, the primary fluid conduit 106 may couple to the valve 116 in the plane of the illustration and the secondary fluid conduit 114 may couple to the valve 116 at some angle intersecting the plane of the illustration. One of skill in the art may determine the most beneficial orientation of conduits in relation to the valve 116 for a given application of the system 100.

The system 100 may further comprise a controller 122 in communication with an actuator. The actuator may comprise an electric motor, solenoid, pneumatic actuator, and/or other actuating device that may turn the valve according to a signal received from the controller 122. The controller 122 includes a valve position target module that generates a valve position target, and a valve position command module that generates a valve position command in response to the valve position target. The actuator may receive the valve position command and turn the valve 116 in response to the valve position command. In one embodiment, turning the valve 116 in response to the valve position command comprises turning the valve 116 one of a first direction corresponding to a standard mode, and a second direction corresponding to a brake mode.

Figure 2:
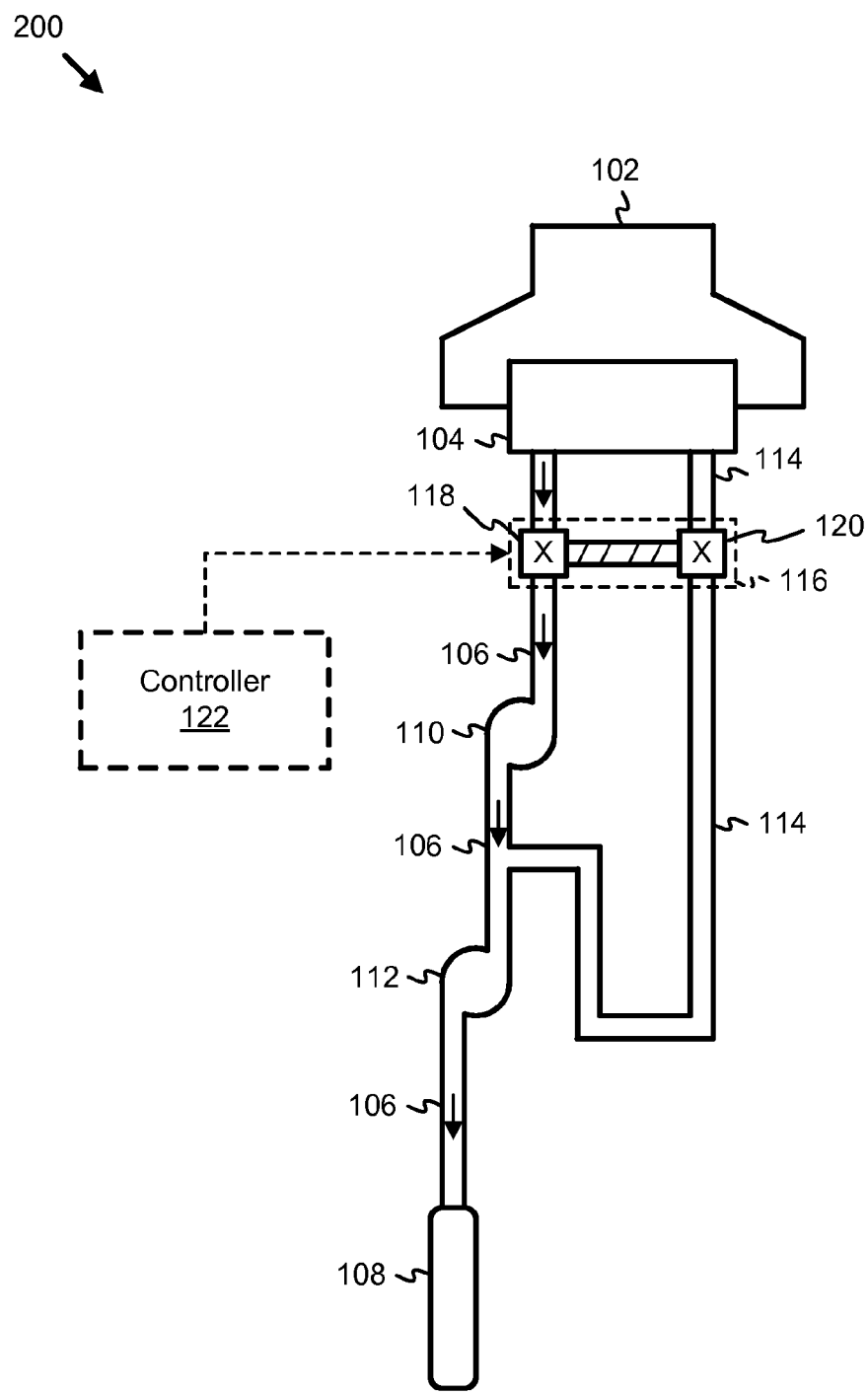
FIG. 2 is a schematic block diagram depicting an alternate embodiment of a system for a single-actuated multi-function valve in accordance with the present invention.

FIG. 2 is a schematic block diagram depicting an alternate embodiment of a system 200 for a single-actuated multi-function valve 116 in accordance with the present invention. The system 200 comprises the engine 102 coupled to the exhaust manifold 104. Exhaust gas is directed to the exhaust outlet 108 through the high pressure turbocharger 110 and the low pressure turbocharger 112 via the primary fluid conduit 106. The system 200 further comprises the secondary fluid conduit 114 directing exhaust gas to the exhaust outlet 108 through the low pressure turbocharger 112. The system 200 further comprises the valve 116 comprising the first flow passage 118 and the second flow passage 120. The passages comprise variable restrictions 118, 120. The controller 122 is in communication with an actuator coupled to the valve 116. The embodiment of the system 200 shows the valve 116 located where the first flow passage 118 is disposed within the primary fluid conduit 106 upstream of the high pressure turbocharger 110.

Figure 3:
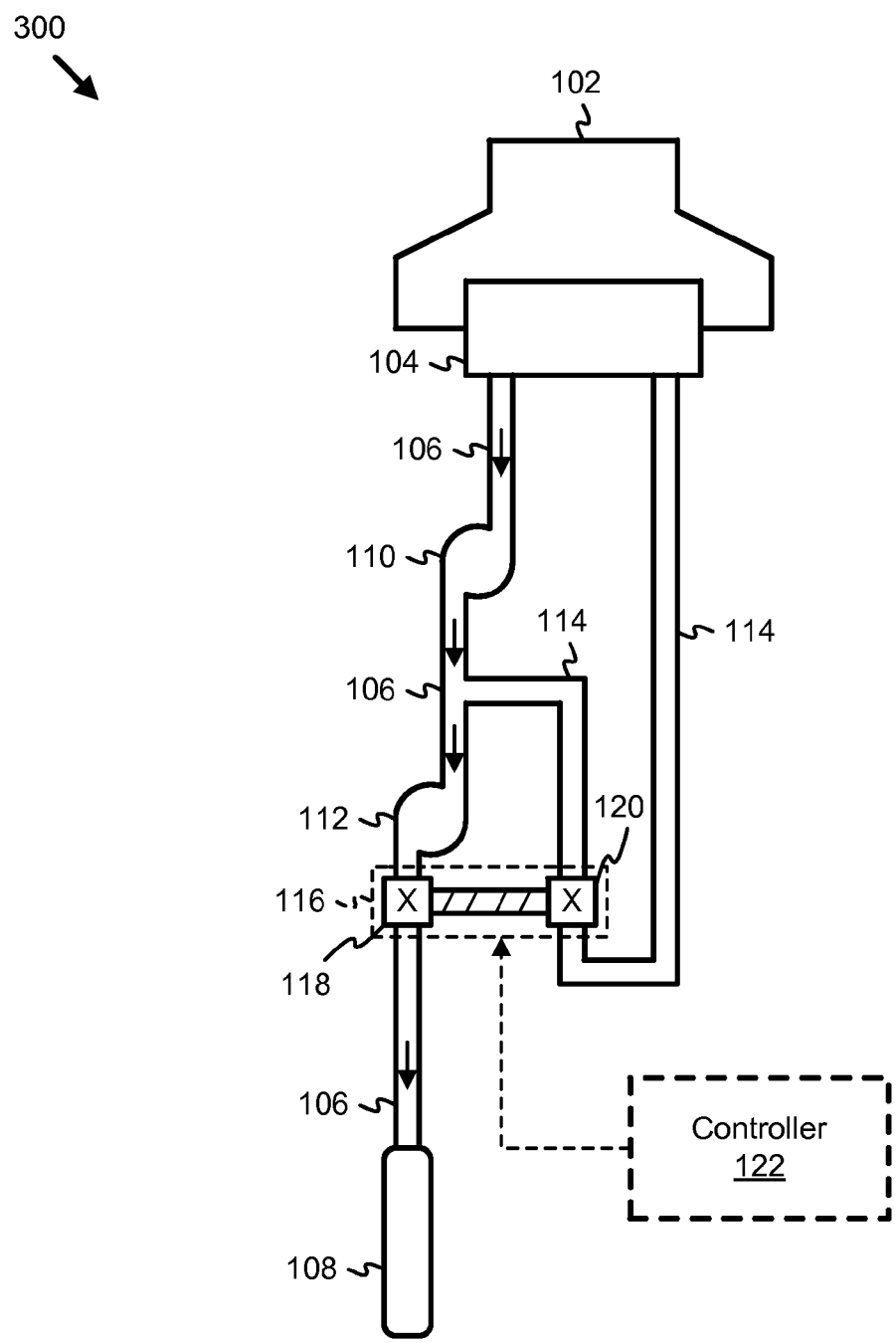
FIG. 3 is a schematic block diagram depicting an alternate embodiment of a system for a single-actuated multi-function valve in accordance with the present invention.

FIG. 3 is a schematic block diagram depicting an alternate embodiment of a system 300 for a single-actuated multi-function valve 116 in accordance with the present invention. The system 300 comprises the engine 102 coupled to the exhaust manifold 104. Exhaust gas is directed to the exhaust outlet 108 through the high pressure turbocharger 110 and the low pressure turbocharger 112 via the primary fluid conduit 106. The system 300 further comprises the secondary fluid conduit 114 directing exhaust gas to the exhaust outlet 108 through the low pressure turbocharger 112. The system 300 further comprises the valve 116 comprising the first flow passage 118 and the second flow passage 120. The passages comprise variable restrictions 118, 120. The controller 122 is in communication with an actuator coupled to the valve 116. The embodiment of the system 300 shows the valve 116 located where the first flow passage 118 is disposed within the primary fluid conduit 106 downstream of the low pressure turbocharger 112.

Figure 4A:
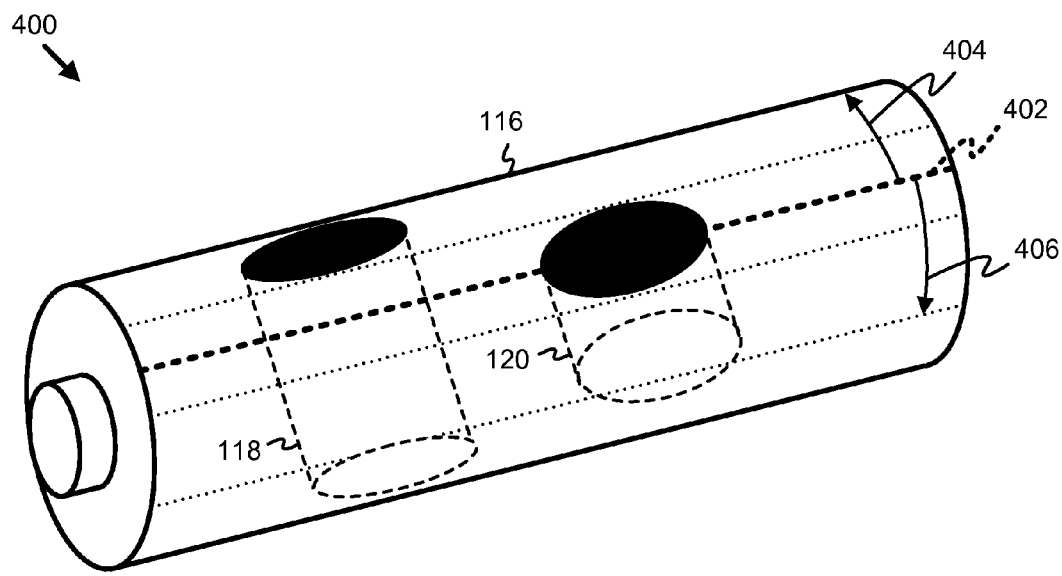
FIG. 4A is a schematic illustration depicting one embodiment of an apparatus for a single-actuated multi-function valve in accordance with the present invention.

FIG. 4A is a schematic illustration depicting one embodiment of an apparatus 400 for a single-actuated multi-function valve 116 in accordance with the present invention. For purposes of clarity conduits coupling to the valve 116 are considered to lie within the same plane although other orientations are contemplated. Where the primary fluid conduit 106 and the secondary fluid conduit 114 lie in differing planes, the orientation of the flow passages 118, 120 will differ from the examples in FIGS. 4A through 7 by an angle equal to the difference in the projected angle on a two-dimensional surface of the two fluid conduits 106, 114. For example, if the primary fluid conduit 114 approaches the valve 116 horizontally, and the secondary fluid conduit 114 approaches the valve 116 vertically, and an example herein describes the flow passages 118, 120 separated by an angle of 40 degrees, the translated angle would be 130 degrees of separation to be equivalent. This translation is a mechanical step for one of skill in the art, and is not shown to avoid obscuring aspects of the present invention.

The apparatus 400 comprises the first flow passage 118 and the second flow passage 120. In one embodiment the valve 116 is operable in a standard mode. The standard mode may control an amount of primary flow in the primary fluid conduit 106, and an amount of bypass flow in the secondary fluid conduit 114. In one embodiment the valve 116 may comprise a nominal position 402 corresponding to a high primary flow wherein the first flow passage 118 is fully aligned with the primary fluid conduit 106, and turning the valve 116 a first direction 404 may increase the bypass flow by beginning to align the second flow passage 120 with the secondary fluid conduit 114 while reducing the alignment of the first flow passage 118 with the primary fluid conduit 106.

The valve 116 may be further operable in a brake mode. The brake mode may comprise an increased variable restriction in the first flow passage 118 and the second flow passage 120 achievable by turning the valve 116 in a second direction 406. For example, from the nominal position the valve 116 turning in the second direction 406 may begin reducing the flow area aligned with the primary fluid conduit 106 in the first flow passage 118, while not increasing the flow area aligned with the secondary fluid conduit 114 in the second flow passage 120. In alternate embodiments of the valve 116 additional passages, perhaps with less flow area than the first and second fluid passages 118, 120, may be opened in the braking mode to prevent stalling of the engine 102. In one embodiment the standard mode and the brake mode may occur within about 180 total degrees of rotation of the valve 116. The braking mode includes any operations that involve increasing the total restriction on exhaust flow exiting the exhaust outlet 108, specifically including, without limitation, exhaust braking and exhaust throttling.

In one embodiment of the apparatus 400 where the valve nominal position is at about 0 degrees the bypass flow may occur (i.e. some of the flow area of the second fluid passage 120 is aligned with the secondary fluid conduit 114) between about 0 to 120 degrees of valve rotation, and the primary flow may occur (i.e. some of the flow area of the first fluid passage 118 is aligned with the primary fluid conduit 106) between about 30 to 150 degrees of valve rotation. In the above embodiment the brake mode may occur below 0 degrees of valve rotation.

In a further embodiment of the apparatus 400 where the valve nominal position is at about 0 degrees the bypass flow may occur between about 0 to 60 degrees of valve rotation, and the primary flow may occur between about 40 to 100 degrees of valve rotation. The brake mode may occur below 0 degrees of valve rotation. One of skill in the art may determine the optimum orientation of exhaust flow conduits in the engine 102 and the corresponding passages in the valve 116 based on the desired performance characteristics, the packaging requirements for the selected embodiment, and the disclosures herein.

Figure 4B:
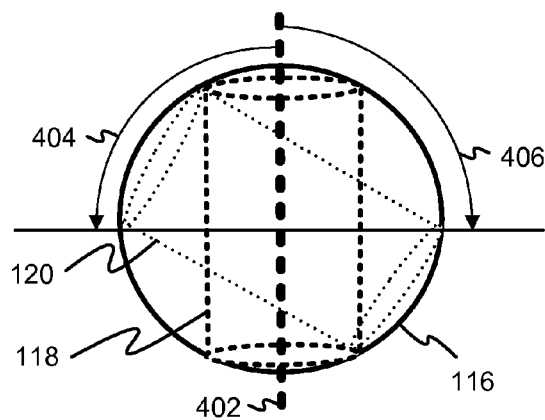
FIG. 4B is a cross section of FIG. 4A elements in accordance with the present invention.

FIG. 4B is a cross section of FIG. 4A elements in accordance with the present invention. In one embodiment of the apparatus 400 the projected passage 118, 120 entrances and egresses do not intersect radially on the valve surface, which allows the valve 116 to be positioned such that either primary flow or bypass flow may be shut off completely. In alternate embodiments the projected passage 118, 120 entrances and egresses may intersect radially on the valve surface, which allows some primary flow and some bypass flow to occur at valve 116 positions, although the ratio of exhaust flow passing through the primary fluid conduit 106 and the secondary fluid conduit 114 will vary with valve 116 position. In one example, radial intersections of projected first passage 118 and the projected second passage 120 on the valve surface may permit smooth exhaust flow transitions as the valve 116 rotates during operation of the engine 102.

Figure 5:
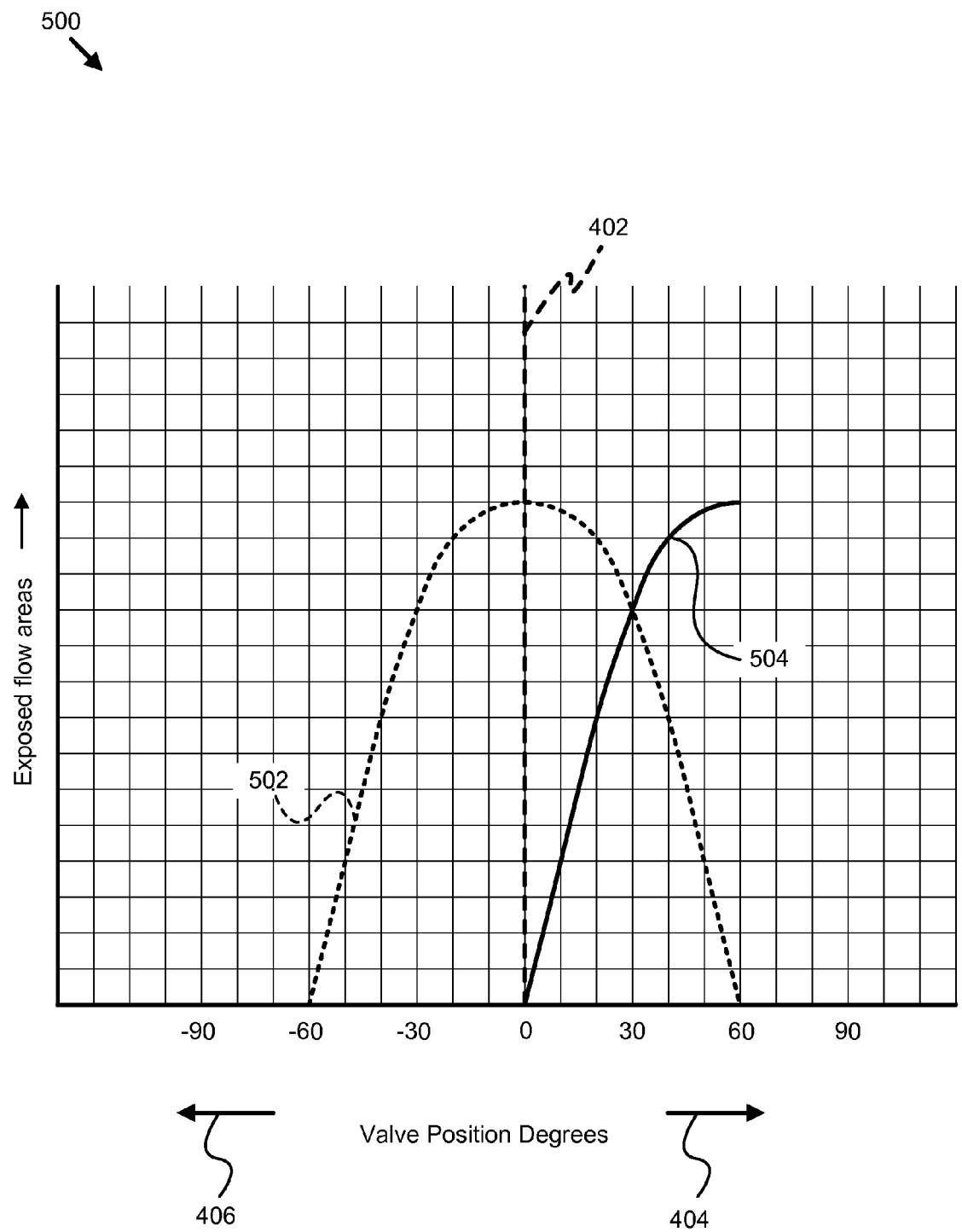
FIG. 5 is a phase diagram showing one embodiment of exposed flow areas for a corresponding valve position of FIG. 4A elements in accordance with the present invention.

FIG. 5 is a phase diagram 500 showing exposed flow areas for corresponding valve positions of FIG. 4A elements in accordance with the present invention. The phase diagram depicts an embodiment where the secondary fluid conduit 114 exposed flow area 502 is large at the valve nominal position 402. The valve nominal position 402 is defined as zero degrees herein as an example convention, but the valve nominal position may be defined as any angle, as any standard angle utilized for the valve nominal position 402 is a matter of preference for a practitioner and is equivalent. As the passages in the embodiment of the apparatus 400 do not intersect radially on the surface of the valve 116 the primary fluid conduit 106 exposed flow area 504 may be zero at the nominal position 402 where the secondary fluid conduit 114 exposed flow area is maximum, and the primary fluid conduit 106 exposed flow area 504 increases as the valve 116 is rotated in the first direction 404 corresponding to the standard mode. The valve 116 may also be rotated in the second direction 406 corresponding to the brake mode. As the valve 116 rotates in the second direction 406 the secondary fluid conduit exposed flow area 502 may be reduced.

Figure 6A:
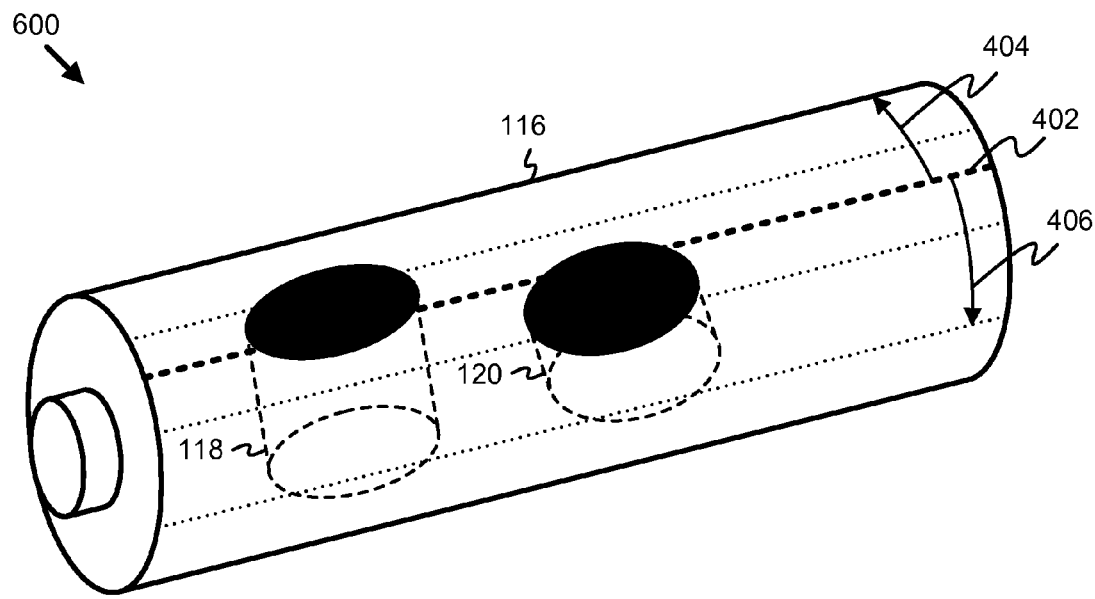
FIG. 6A is a schematic illustration depicting one embodiment of an apparatus for a single-actuated multi-function valve in accordance with the present invention.

FIG. 6A is a schematic illustration depicting one embodiment of an apparatus 600 for a single-actuated multi-function valve in accordance with the present invention. The apparatus 600 comprises the first flow passage 118 and the second flow passage 120. In one embodiment the valve 116 is operable in a standard mode. The standard mode may control an amount of primary flow in the primary fluid conduit 106, and an amount of bypass flow in the secondary fluid conduit 114. In the depicted embodiment of FIG. 6A the valve 116 is shown operating with a partial bypass flow and a partial primary flow in the nominal position 402. In the depicted embodiment of the apparatus 600 the projected first flow passage 118 and the second flow passage 120 intersect radially on the surface of the valve 116. The intersection may allow smoother operation of the engine 102 as the valve 116 rotates. The orientation of the first flow passage 118 and the second flow passage 120 within the valve 116 may be determined by one of skill in the art based on the specific design and performance considerations for a given application of the present invention and the disclosures herein. For example, the primary fluid conduit 106 and the secondary fluid conduit 114 may intersect the valve 116 at widely diverging angles requiring adjustment of the first flow passage 118 and the second flow passage 120 from the examples depicted to achieve similar flow results.

Figure 6B:
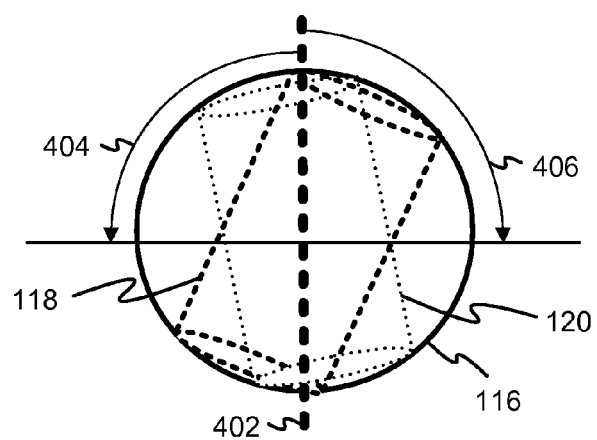
FIG. 6B is a cross section of FIG. 6A elements in accordance with the present invention.

FIG. 6B is a cross section of FIG. 6A elements in accordance with the present invention. In the depicted embodiment of the apparatus 600 where conduits coupled to the valve 116 lie in the plane of the valve 116 the projected passage 118, 120 entrances and egresses intersect radially on the valve surface, though not axially.

Figure 7:
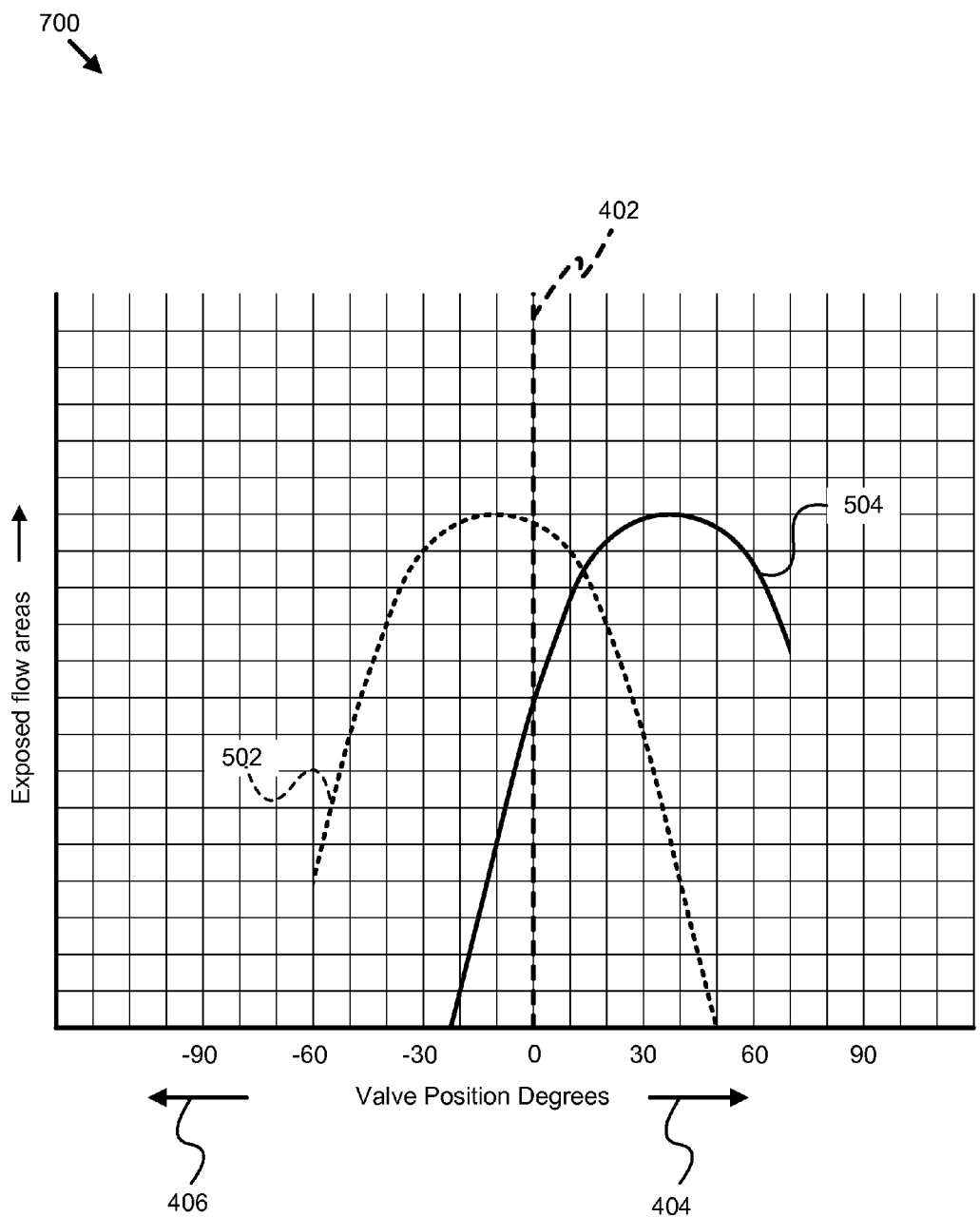
FIG. 7 is a phase diagram showing one embodiment of exposed flow areas for corresponding valve positions of FIG. 6A elements in accordance with the present invention.

FIG. 7 is a phase diagram showing exposed flow areas for corresponding valve positions of FIG. 6A elements in accordance with the present invention. The phase diagram depicts an embodiment where the secondary fluid conduit exposed flow area 502 is nearly at a maximum in the valve nominal position 402. In the depicted embodiment, where conduits coupled to the valve 116 lie in the plane of the valve 116, the passages of the apparatus 600 intersect radially on the surface of the valve 116 permitting exhaust flow also in the primary fluid conduit 106 at the nominal position 402. As the valve 116 rotates in the first direction 404 the secondary fluid conduit exposed flow area 502 reduces as the primary fluid conduit exposed area 504 initially increases before reducing again. The valve 116 may also be rotated in the second direction 406 corresponding to the brake mode. In the depicted embodiment as the valve 116 rotates in the second direction 406, the secondary fluid conduit exposed flow area 502 increases initially before reducing, and the primary fluid conduit exposed area 504 reduces.

Figure 8:
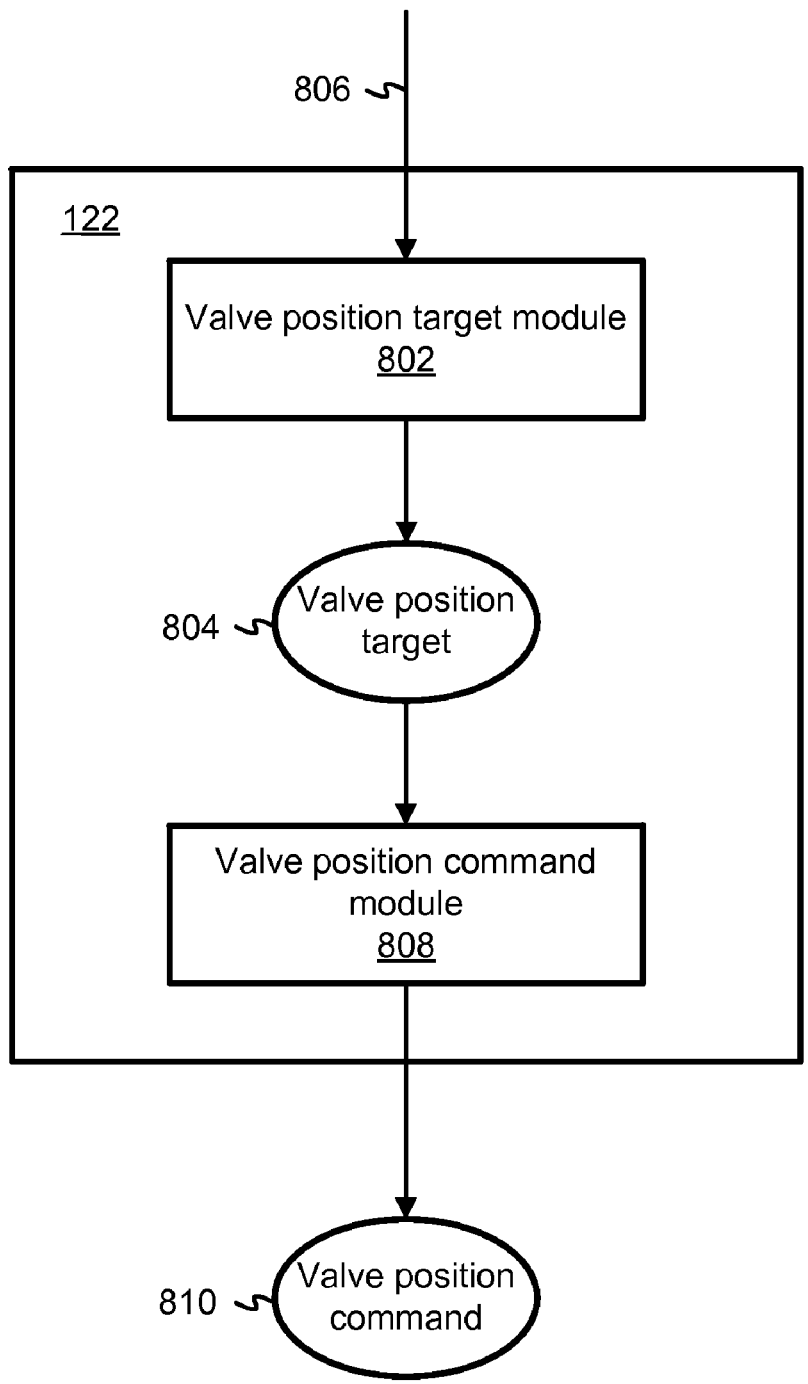
FIG. 8 is a schematic block diagram depicting one embodiment of a controller for a single-actuated multi-function valve in accordance with the present invention.

FIG. 8 is a schematic block diagram depicting one embodiment of a controller 122 for a single-actuated multi-function valve in accordance with the present invention. The controller 122 may be in communication with an actuator (not shown) coupled to the valve 116. The actuator may be mechanically, electronically, and/or pneumatically coupled to the valve 116. The controller 122 may comprise a valve position target module 802 configured to generate a valve position target 804. The valve position target module 802 may generate the valve position target 804 in response to signal input 806 from a datalink, sensors, and/or other signal source indicating an operating state 806 of the engine 102.

The controller 122 may further comprise a valve position command module 808 configured to generate a valve position command 810 in response to the valve position target 804. The actuator receiving the valve position command 810 may turn the valve 116 in response to the valve position command 810.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 9:
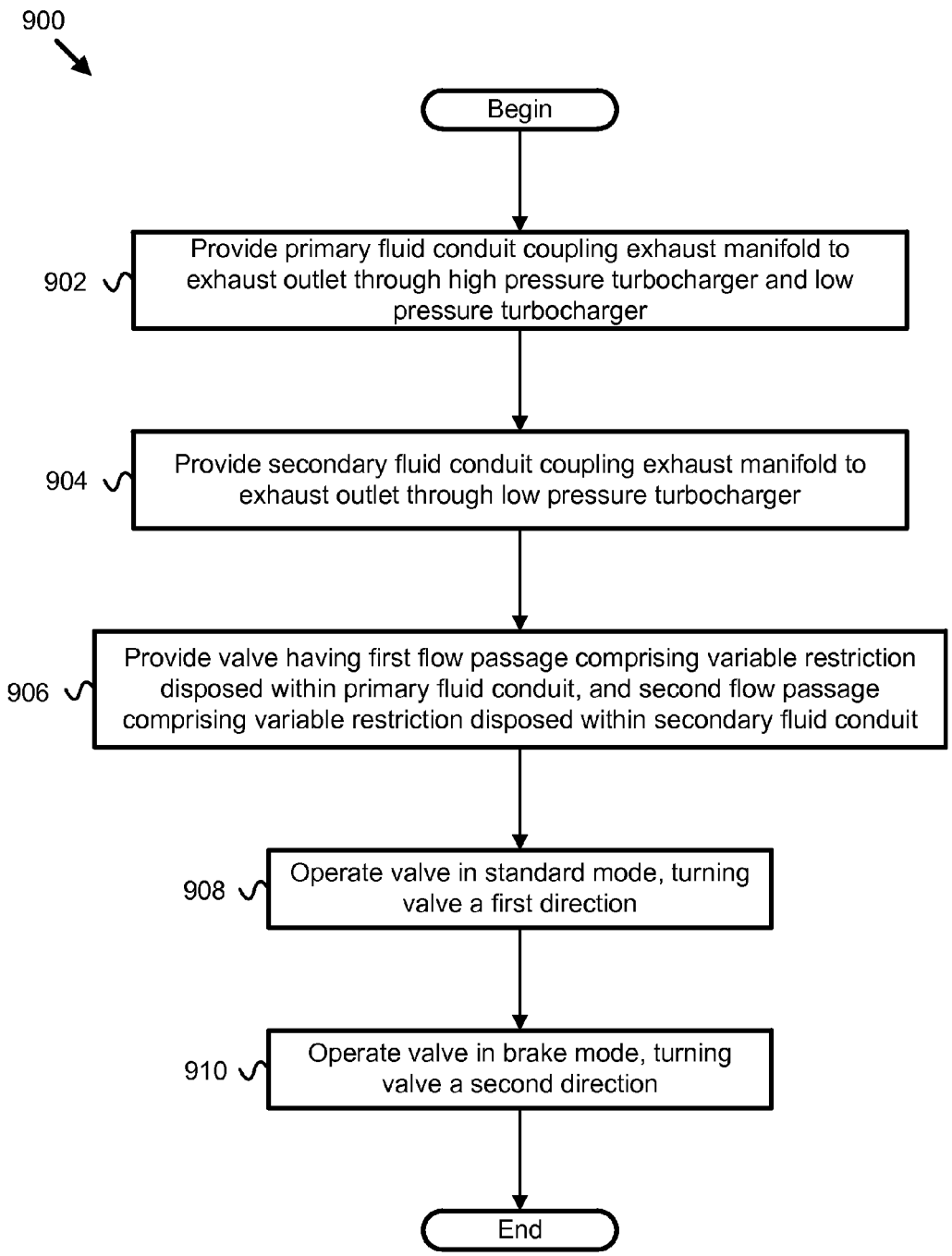
FIG. 9 is a schematic flow chart diagram depicting one embodiment of a method for implementing a single-actuated multi-function valve in accordance with the present invention.

FIG. 9 is a schematic flow chart diagram depicting one embodiment of a method 900 for implementing a single-actuated multi-function valve in accordance with the present invention. The method 900 comprises providing 902 a primary fluid conduit fluidly coupling the exhaust manifold to an exhaust outlet through a high pressure turbocharger and a low pressure turbocharger. The method 900 further includes providing 904 the secondary fluid conduit fluidly coupling the exhaust manifold to the exhaust outlet through the low pressure turbocharger. The method 900 continues by providing 906 a valve having a first flow passage comprising a variable restriction disposed within the primary fluid conduit, and the valve having a second flow passage comprising a variable restriction disposed within the secondary fluid conduit.

The method 900 proceeds with a controller 122 operating 908 the valve in a standard mode by turning the valve in a first direction. In one embodiment, operating 908 in the standard mode comprises turning the valve between a nominal position comprising a high primary flow and a full bypass position comprising a high bypass flow, inclusive. In an alternate embodiment, operating 908 in the standard mode comprises turning the valve between the nominal position comprising a high bypass flow and a full primary position comprising a high primary flow, inclusive. For example, turning the valve from the nominal position to the full primary position may comprise increasing the primary flow and decreasing the bypass flow. The method 900 concludes by operating 910 the valve in a brake mode. In one embodiment, turning the valve from the nominal position to the full primary position comprises turning the valve in a first direction, and operating in the brake mode comprises turning the valve from the nominal position in a second direction.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for controlling the flow of exhaust gas generated by an internal combustion engine of an engine system, the engine system comprising a primary fluid conduit fluidly coupling an exhaust manifold to an exhaust outlet through a high pressure turbocharger and a low pressure turbocharger, and the engine system further comprising a secondary fluid conduit bypassing the high pressure turbocharger to fluidly couple the exhaust manifold to the exhaust outlet through the low pressure turbocharger, the method comprising:

providing a single barrel valve having a rotatable portion, the rotatable portion comprising spaced-apart first and second flow passages formed therethrough, the first flow passage comprising an inlet communicable in fluid receiving communication with a first section of a primary fluid conduit and an outlet communicable in fluid providing communication with a second section of the primary fluid conduit, and the second flow passage comprising an inlet communicable in fluid receiving communication with a first section of a secondary fluid conduit and an outlet communicable in fluid providing communication with a second section of the secondary fluid conduit;

rotating the rotatable portion into a first position to allow fluid to flow through the first flow passage to fluidly couple the first and second sections of the primary fluid conduit, and to prevent fluid flow through the second flow passage to fluidly decouple the first and second sections of the secondary fluid conduit, wherein the rotatable portion is rotated into the first position during periods of operation of the internal combustion engine resulting in at least one of a low pressure, low mass flow, and low velocity of exhaust gas within the primary fluid conduit;

rotating the rotatable portion into a second position to allow fluid to flow through the second flow passage to fluidly couple the first and second sections of the secondary fluid conduit, and to prevent fluid flow through the first flow passage to fluidly decouple the first and second sections of the primary fluid conduit, wherein the rotatable portion is rotated into the second position during periods of operation of the internal combustion engine resulting in at least one of a high pressure, high mass flow, and high velocity of exhaust gas within the primary fluid conduit; and rotating the rotatable portion into any of various intermediate positions between the first and second positions to allow fluid to flow through both the first and second flow passages to fluidly couple the first and second sections of the primary and secondary fluid conduits, respectively, wherein the rotatable portion is rotated into the plurality of intermediate positions during periods of operation of the internal combustion engine resulting in at least one of exhaust gas within the primary fluid conduit having an intermediate pressure between the low and high pressures, exhaust gas within the primary fluid conduit having an intermediate mass flow between the low and high mass flows, and exhaust gas within the primary fluid conduit having an intermediate velocity between the low and high velocities.

2. The method of claim 1, further comprising operating the engine system in a standard mode, wherein during operation of the engine system in the standard mode, the method comprises turning the valve between a nominal position comprising a high primary flow, and a full bypass position comprising a high bypass flow, inclusive.

3. The method of claim 1, further comprising operating the engine system in a standard mode, wherein during operation of the engine system in the standard mode, the method comprises turning the valve between a nominal position comprising a high bypass flow, and a full primary position comprising a high primary flow, inclusive.

4. The method of claim 3, wherein turning the valve from the nominal position to the full primary position comprises increasing the primary flow and decreasing the bypass flow.

5. The method of claim 3, wherein turning the valve from the nominal position to the full primary position comprises turning the valve in a first direction, the method further comprising operating the engine system in a brake mode, wherein during operation of the engine system in the brake mode, the method comprises operating in the brake mode comprises turning the valve from the nominal position in a second direction.

6. An apparatus comprising:
a primary fluid conduit for fluidly coupling an exhaust manifold of an internal combustion engine to an exhaust outlet, wherein the primary fluid conduit comprises a high pressure turbocharger and a low pressure turbocharger positioned between the exhaust manifold of the internal combustion engine and the exhaust outlet;
a secondary fluid conduit for fluidly coupling the exhaust manifold of the internal combustion engine to the primary fluid conduit at a location between the high pressure turbocharger and the low pressure turbocharger; and
a single-actuated valve having a movable portion, the movable portion comprising spaced-apart first and second flow passages extending therethrough, the first flow passage comprising an inlet communicable in fluid receiving communication with a first section of the primary fluid conduit and an outlet communicable in fluid providing communication with a second section of the primary fluid conduit, and the second flow passage comprising an inlet communicable in fluid receiving communication with a first section of the secondary fluid conduit and an outlet communicable in fluid providing communication with a second section of the secondary fluid conduit;
wherein the movable portion is movable into a first position, a second position, and a plurality of intermediate positions between the first and second positions,
wherein in the first position, fluid is flowable through the first flow passage to fluidly couple the first and second sections of the primary fluid conduit, and fluid is not flowable through the second flow passage such that the first and second sections of the secondary fluid conduit are fluidly decoupled, and wherein the movable portion is movable into the first position during periods of operation of the internal combustion engine resulting in at least one of a low pressure, low mass flow, and low velocity of exhaust gas within the primary fluid conduit, and
wherein in the second position, fluid is flowable through the second flow passage to fluidly couple the first and second sections of the secondary fluid conduit, and fluid is not flowable through the first flow passage such that the first and second sections of the primary fluid conduit are fluidly decoupled, and wherein the movable portion is movable into the second position during periods of operation of the internal combustion engine resulting in at least one of a high pressure, high mass flow, and high velocity of exhaust gas within the primary fluid conduit, and wherein in the plurality of intermediate positions, fluid is flowable through the first flow passage to fluidly couple the first and second sections of the primary fluid conduit, and fluid is flowable through the second flow passage to fluidly couple the first and second sections of the secondary fluid conduit, and wherein the movable portion is movable into the plurality of intermediate positions during periods of operation of the internal combustion engine resulting in at least one of exhaust gas within the primary fluid conduit having an intermediate pressure between the low and high pressures, exhaust gas within the primary fluid conduit having an intermediate mass flow between the low and high mass flows, and exhaust gas within the primary fluid conduit having an intermediate velocity between the low and high velocities.

7. The apparatus of claim 6, wherein the internal combustion engine is operable in a standard mode, wherein in the standard mode, the single-actuated valve controls an amount of primary flow in the second section of the primary fluid conduit, and an amount of bypass flow in the second section of the secondary fluid conduit.

8. The apparatus of claim 7, wherein the valve operates at a high primary flow in a nominal position, and increases the bypass flow as the valve turns in a first direction.

9. The apparatus of claim 7, wherein the valve operates at a high bypass in a nominal position, and increases the primary flow as the valve turns in a first direction.

10. The apparatus of claim 9, wherein the internal combustion engine is operable in a brake mode, wherein in the brake mode, the valve turns in a second direction opposite the first direction to reduce the primary flow in the second section of the primary fluid conduit and reduce the bypass flow in the second section of the secondary conduit.

11. The apparatus of claim 10, wherein during operation of the internal combustion engine in the standard mode and the brake mode, the movable portion rotates at most about 180 total degrees.

12. The apparatus of claim 10, wherein the nominal position is at about 0 degrees, wherein bypass flow occurs between about 0 to 120 degrees of valve rotation, wherein primary flow occurs between about 30 to 150 degrees of valve rotation, and wherein during brake mode, the position of the valve is below 0 degrees of valve rotation.

13. The apparatus of claim 10, wherein the nominal position is at about 0 degrees, wherein bypass flow occurs between about 0 to 60 degrees of valve rotation, wherein primary flow occurs between about 40 to 100 degrees of valve rotation, and wherein during brake mode, the position of the valve is below 0 degrees of valve rotation.

14. The apparatus of claim 9, wherein the nominal position is at about 0 degrees, wherein bypass flow occurs between about 0 to 60 degrees of valve rotation, and wherein primary flow occurs between about 40 to 100 degrees of valve rotation.

15. The apparatus of claim 6, wherein the first flow passage is disposed within the primary fluid conduit at a position upstream of the high pressure turbocharger.

16. The apparatus of claim 6, wherein the first flow passage is disposed within the primary fluid conduit at a position downstream of the high pressure turbocharger and upstream of the low pressure turbocharger.

17. The apparatus of claim 6, wherein the first flow passage is disposed within the primary fluid conduit at a position downstream of the low pressure turbocharger.

18. The apparatus of claim 6, wherein the valve comprises a barrel valve.

19. A system comprising:
an internal combustion engine producing an exhaust flow, the exhaust flow directed into an exhaust manifold coupled to the combustion engine;
a primary fluid conduit for fluidly coupling an exhaust manifold to an exhaust outlet, wherein the primary fluid conduit comprises a high pressure turbocharger and a low pressure turbocharger positioned between the exhaust manifold and the exhaust outlet;
a secondary fluid conduit for fluidly coupling the exhaust manifold to the primary fluid conduit at a location between the high pressure turbocharger and the low pressure turbocharger; and
a single barrel-type valve comprising a rotatable portion, the rotatable portion comprising spaced-apart first and second flow passages extending therethrough, the first flow passage comprising an inlet communicable in fluid receiving communication with a first section of the primary fluid conduit and an outlet communicable in fluid providing communication with a second section of the primary fluid conduit, and the second flow passage comprising an inlet communicable in fluid receiving communication with a first section of the secondary fluid conduit and an outlet communicable in fluid providing communication with a second section of the secondary fluid conduit;
wherein the rotatable portion is rotatable into a first position, a second position, and a plurality of intermediate positions between the first and second positions,
wherein in the first position, fluid is flowable through the first flow passage to fluidly couple the first and second sections of the primary fluid conduit, and fluid is not flowable through the second flow passage such that the first and second sections of the secondary fluid conduit are fluidly decoupled, and wherein the rotatable portion is rotatable into the first position during periods of operation of the internal combustion engine resulting in at least one of a low pressure, low mass flow, and low velocity of exhaust gas within the primary fluid conduit,
wherein in the second position, fluid is flowable through the second flow passage to fluidly couple the first and second sections of the secondary fluid conduit, and fluid is not flowable through the first flow passage such that the first and second sections of the primary fluid conduit are fluidly decoupled, wherein the rotatable portion is rotatable into the second position during periods of operation of the internal combustion engine resulting in at least one of a high pressure, high mass flow, and high velocity of exhaust gas within the primary fluid conduit, and
wherein in the plurality of intermediate positions, fluid is flowable through the first flow passage to fluidly couple the first and second sections of the primary fluid conduit, and fluid is flowable through the second flow passage to fluidly couple the first and second sections of the secondary fluid conduit, wherein the rotatable portion is rotatable into the plurality of intermediate positions during periods of operation of the internal combustion engine resulting in at least one of exhaust gas within the primary fluid conduit having an intermediate pressure between the low and high pressures, exhaust gas within the primary fluid conduit having an intermediate mass flow between the low and high mass flows, and exhaust gas within the primary fluid conduit having an intermediate velocity between the low and high velocities.

20. The system of claim 19, wherein the first flow passage is non-parallel with the second flow passage.

21. The system of claim 19, further comprising a controller in communication with an actuator, the controller comprising a valve position target module configured to generate a valve position target, and a valve position command module configured to generate a valve position command in response to the valve position target, the actuator further receiving the valve position command and turning the valve in response to the valve position command.

22. The system of claim 21, wherein turning the valve in response to the valve position command comprises turning the valve in one of a first direction corresponding to a standard mode of the internal combustion engine, and a second direction corresponding to a brake mode of the internal combustion engine.

* * * * *